United States Patent
Chen et al.

(10) Patent No.: US 8,442,803 B2
(45) Date of Patent: May 14, 2013

(54) METHOD OF MEASURING RADIATION DOSES ON DIFFERENT DIRECTIONS

(75) Inventors: Yi-Chang Chen, Longtan Shiang (TW); Lun-Hui Lee, Longtan Shiang (TW)

(73) Assignee: Atomic Energy Council - Institute of Nuclear Energy Research, Lungtan, Taoyuan (TW)

( * ) Notice: Subject to any disclaimer, the term of this patent is extended or adjusted under 35 U.S.C. 154(b) by 383 days.

(21) Appl. No.: 12/909,063

(22) Filed: Oct. 21, 2010

(65) Prior Publication Data

US 2012/0101780 A1  Apr. 26, 2012

(51) Int. Cl.
  *G01T 1/02* (2006.01)
  *G01J 5/00* (2006.01)
  *G01D 1/16* (2006.01)
  *G06F 19/00* (2006.01)
  *G06F 17/40* (2006.01)

(52) U.S. Cl.
  USPC ........ 702/189; 250/473.1; 340/600; 378/165; 702/1; 702/127; 702/187

(58) Field of Classification Search ............ 73/1.01, 73/432.1, 865.8; 250/252.1, 306, 472.1, 473.1; 340/500, 540, 600; 378/1, 162, 165; 702/1, 702/85, 104, 127, 187, 189; 708/100, 105, 708/200, 446; G01D 1/00, 1/16, 21/00; G01J 5/00, G01J 5/10, 2005/10; G01T 1/00, 1/02, 1/16; G06F 11/00, 11/30, 11/32, 17/00, 17/40, G06F 19/00
See application file for complete search history.

(56) References Cited

U.S. PATENT DOCUMENTS

| | | | |
|---|---|---|---|
| 3,729,632 A * | 4/1973 | Cho et al. | 378/56 |
| 7,608,831 B2 * | 10/2009 | Lamb et al. | 250/370.07 |
| 7,780,352 B2 * | 8/2010 | Fox et al. | 378/207 |
| 2008/0226038 A1 * | 9/2008 | Fox et al. | 378/207 |
| 2009/0236536 A1 * | 9/2009 | Lamb et al. | 250/393 |

* cited by examiner

*Primary Examiner* — Edward Cosimano
(74) *Attorney, Agent, or Firm* — Jackson IPG PLLC

(57) ABSTRACT

The present disclosure measures radiation doses on different directions. A partition is used, which has a certain attenuation ratio. With the partition, radiation doses on different directions can be determined without knowing the thickness or material of the partition.

7 Claims, 4 Drawing Sheets

(a2) processing measurement to a detection point with a partition to obtain a measured value on a side of said partition and a measured value on the opposite side of said partition;

(b2) processing measurement to said detection point to obtain a measured value without using partition; and (c2) figuring out a dose on upward side and a dose on downward side based on said measured values obtained in step (a2) and step (b2)

upward side = [(said measured value without using partition)² - (said measured value on said opposite side of said partition) × (said measured value without using partition)] / [ 2 × (said measured value without using partition) - (said measured value on said side of said partition) - (said measured value on said opposite side of partition)]

downward side = [(said measured value without using partition)² - (said measured value on said side of said partition) × (said measured value without using partition)] / [ 2 × (said measured value without using partition) - (said measured value on said side of said partition) - (said measured value on said opposite side of partition)]

METHOD OF MEASURING RADIATION DOSES ON DIFFERENT DIRECTIONS

TECHNICAL FIELD OF THE DISCLOSURE

The present disclosure relates to measuring radiation dose, and more particularly, relates to using a partition having attenuation for measuring radiation doses on different directions.

DESCRIPTION OF THE RELATED ARTS

In a radiation environment, a radiation dose check at a detection point has to be done regularly. Equipment used for checking the radiation dose include radiation detector and thermoluminescent dosimeter (TLD). However, they only measure the sum of the radiation doses on all directions.

Yet, in some cases, dose on a certain direction has to be acquired. For example, on removing a nuclear facility, an effect of radiation dose on moving or destructing equipment at a certain direction has to be known. But, common tools used for detecting doses on different directions have the following problems:

1. Although the radiation detector may be directional, it only means the radiation detector has different sensitivities to radiation on different direction. For example, the radiation detector may receive 100% radiation on the front and only 80% radiation on its side. The radiation dose thus measured is basically a dose sum without varying each dose on each direction.

2. TLD only receives and sums up radiation doses on different directions yet does not vary the doses on different directions.

3. A thick shield may be used for measuring a radiation dose on a certain direction by blocking radiation from the other directions. But, the operation may become complex, and it may not be possible to be used in a small room.

Hence, the prior arts do not fulfill all users' requests on actual use.

SUMMARY OF THE DISCLOSURE

The main purpose of the present disclosure is to use a partition having attenuation for measuring radiation doses on different directions.

To achieve the above purpose, the present disclosure is a method of measuring radiation doses on different directions, comprising steps of: (a) processing measurement of a detection point with a partition to obtain a measured value above the partition and a measured value below the partition; (b) processing measurement of the detection point to obtain a measured value without using partition; and (c) determining a dose on upward side and a dose on downward side based on the measured values obtained in step (a) and step (b). Accordingly, a novel method of measuring radiation doses on different directions is obtained.

BRIEF DESCRIPTIONS OF THE DRAWINGS

The present disclosure will be better understood from the following detailed description of the preferred embodiments according to the present disclosure, taken in conjunction with the accompanying drawings, in which FIG. 1 is the figure showing the first preferred embodiment according to the present disclosure;

DESCRIPTION OF THE PREFERRED EMBODIMENTS

The following descriptions of the preferred embodiments are provided to understand the features and the structures of the present disclosure.

Figure 1:
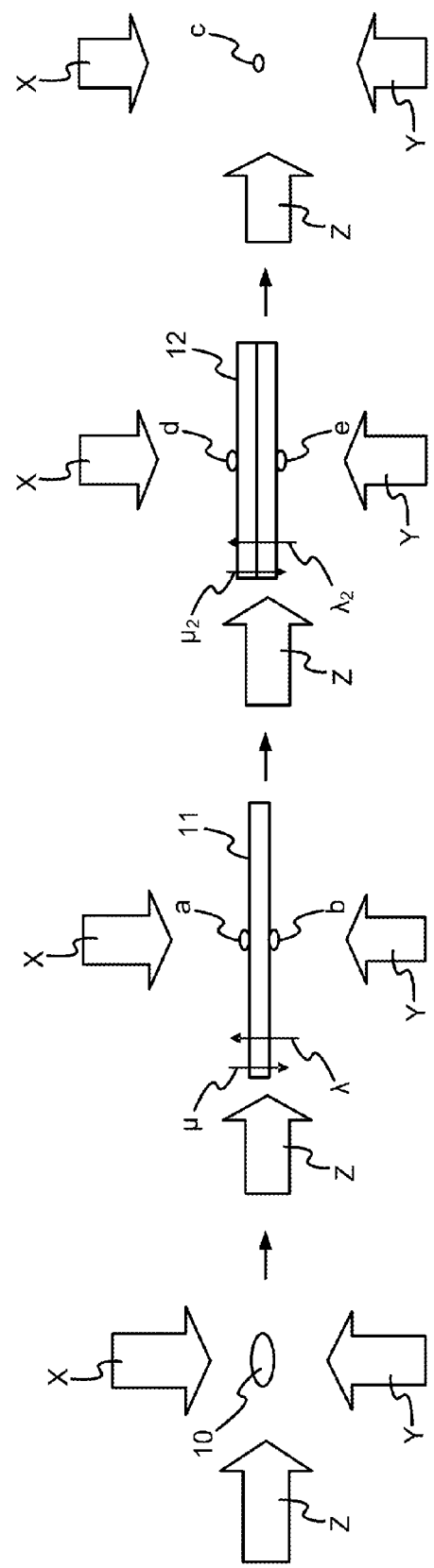

FIG. 1 shows a first preferred embodiment according to the present disclosure. As shown in the figure, the present disclosure is a method of measuring radiation doses on different directions, comprising the following steps:

(a1) At a detection point 10, a measurement is processed to measure doses above and below surfaces of a single partition 11. Thus, a measured value {a} above the single partition 11 and a measured value {b} below the single partition 11 are obtained while the single partition 11 is placed facing upward and downward with an attenuation ratio {$\mu$} to a dose on upward side of the single partition 11 and an attenuation ratio {$\lambda$} to a dose on downward side of the single partition 11.

(b1) At the detection point 10, a measurement is processed to measure doses above and below surfaces of a dual-partition 12. Thus, a measured value {d} above the dual-partition 12 and a measured value {e} below the dual-partition 12 are obtained while the dual-partition 12 is placed facing upward and downward with an attenuation ratio {$\mu_2$} to the dose on upward side of the dual-partition 12 and an attenuation ratio {$\lambda_2$} to the dose on downward side of the dual-partition 12.

(c1) At the same detection point 10, a measurement is processed to obtain a measured value {c} without using partition.

(d1) Based on the measured values obtained in the above steps, the dose {X} on upward side, the dose {Y} on downward side and a dose {Z} on surrounding side are determined as follows:

(The measured value {a} above the single partition)=(the dose {X} on upward side)+(the attenuation ratio {$\lambda$} to the dose on downward side)×(the dose {Y} on downward side)+(the dose {Z} on surrounding side), i.e. a=X+$\lambda$×Y+Z.

(The measured value {b} below the single partition)=(the attenuation ratio {$\mu$} to the dose on upward side)×(the dose {X} on upward side)+(the dose {Y} on downward side)+(the dose {Z} on surrounding side), i.e. b=$\mu$×X+Y+Z.

(The measured value {c} without using partition)=(the dose {X} on upward side)+(the dose {Y} on downward side)+(the dose {Z} on surrounding side).

(The measured value {d} above the dual-partition)=(the dose {X} on upward side)+(the attenuation ratio {$\lambda_2$} to the dose on downward side)×(the dose {Y} on downward side)+(the dose {Z} on surrounding side), i.e. d=X+$\lambda_2$×Y+Z.

(The measured value {b} below the single partition)=(the attenuation ratio {$\mu_3$} to the doses on upward and downward sides)×(the dose {X} on upward side)+(the dose {Y} on downward side), i.e. b=$\mu_3$×X+Y.

Thus, unknown numbers (X, Y, Z, $\mu$, $\mu_2$, $\lambda$, $\lambda_2$) are determined as follows:

1. (The dose {X} on upward side)=[(the measured value {c} without using partition)−(the measured value {b} below the single partition)]$^2$/[(the measured value {c} without using partition)+(the measured value {e} below the dual-partition)−2×(the measured value {b} below the single partition)], i.e. X=(c−b)$^2$/(c+e−2×b).

2. (The dose $\{Y\}$ on downward side)=[(the measured value $\{c\}$ without using partition)−(the measured value $\{a\}$ above the single partition)]$^2$/[(the measured value $\{c\}$ without using partition)+(the measured value $\{d\}$ above the dual-partition)−2×(the measured value $\{a\}$ above the single partition)], i.e. $Y=(c-a)^2/(c+d-2\times a)$.

3. (The dose $\{z\}$ on surrounding side)=(the measured value $\{c\}$ without using partition)−(the dose $\{X\}$ on upward side)−(the dose $\{Y\}$ on downward side), i.e. $Z=c-X-Y$.

Figure 2:
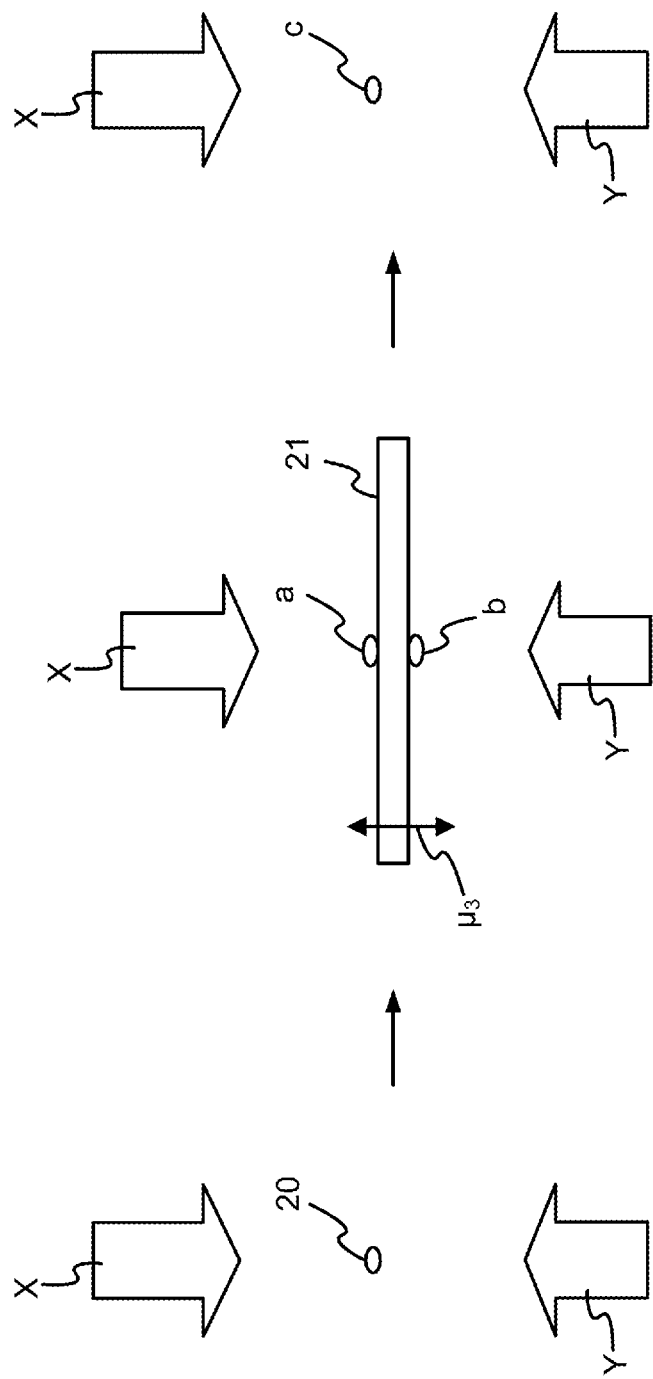
FIG. 2 is the figure showing the second preferred embodiment.
Figure 3:
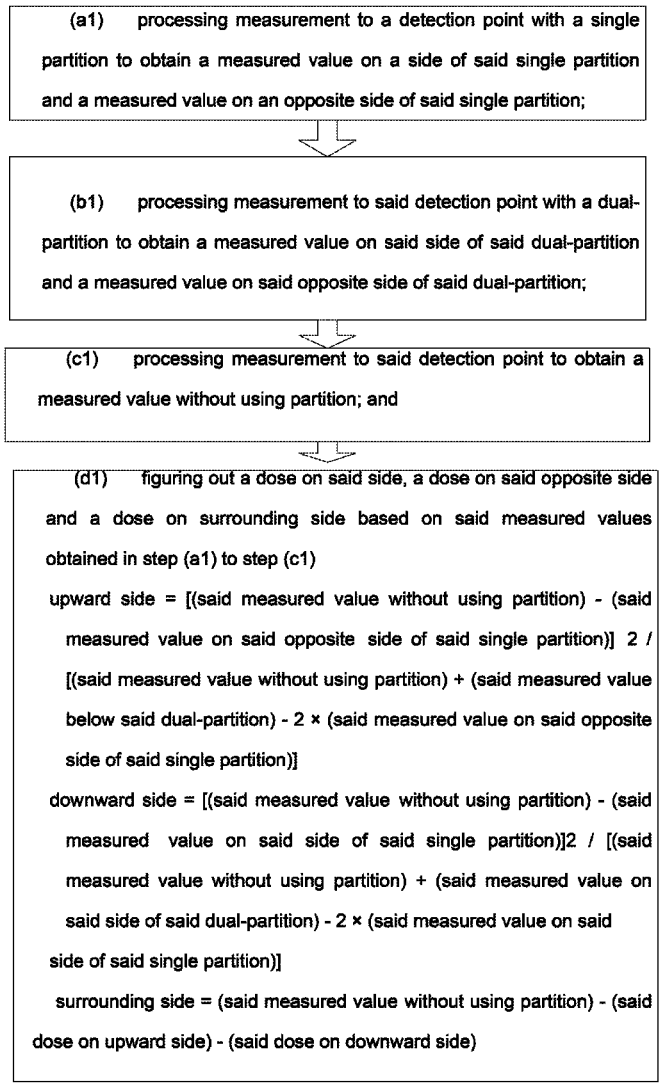
FIG. 3 is a flowchart illustrating the method of claims 1-4.
Figure 4:
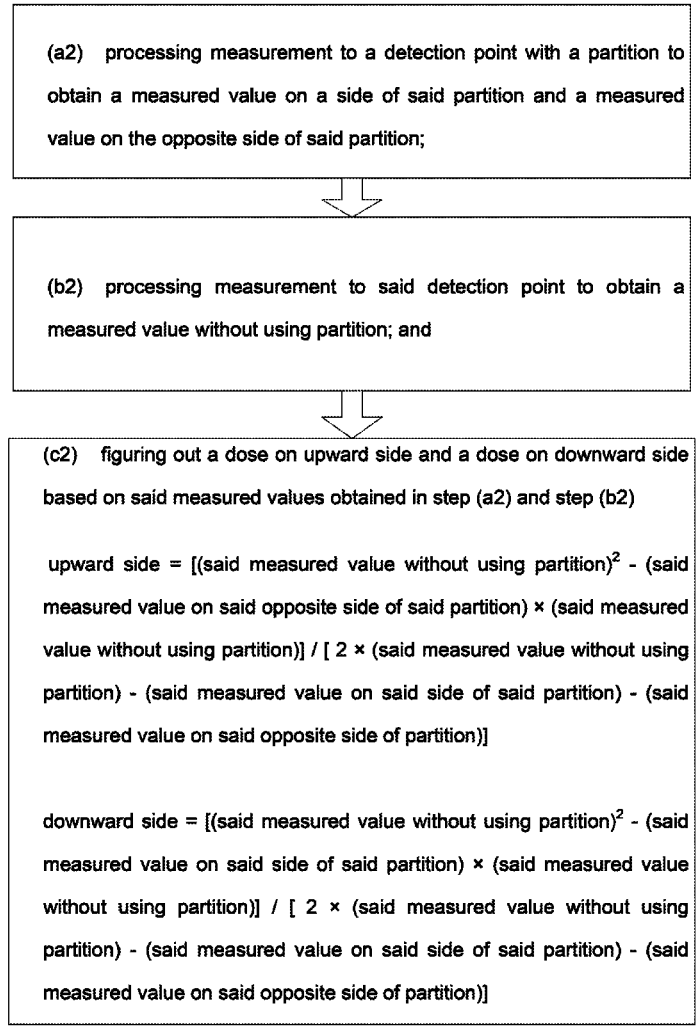
FIG. 4 is a flowchart illustrating the method of claims 5-7.

FIG. 2 shows a second preferred embodiment. As shown in the figure, in a simple environment with radiation only on the upward and the downward directions with the same nuclides, the present disclosure is simplified, comprising the following steps:

(a2) At a detection point 20, a measurement is processed to measure doses above and below surfaces of the partition 21. Thus, a measured value $\{a\}$ above the partition 21 and a measured value $\{b\}$ below the partition 21 are obtained while the partition 21 is placed facing upward and downward with an attenuation ratio $\{\mu_3\}$ to the doses on upward and downward sides of the partition 21.

(b2) At the same detection point 20, a measurement is processed to obtain a measured value $\{c\}$ without using partition.

(c2) Since the dose on surrounding side is zero and the direction is a straight line (travelling distances in the partition are the same), attenuations on upward and downward sides of the partition are the same. Hence, based on the measured values obtained in the above steps, the dose $\{X\}$ on upward side and a dose $\{Y\}$ on downward side are determined as follows:

(The measured value $\{a\}$ above partition)=(the dose $\{X\}$ on upward side)+(the attenuation ratio $\{\mu_3\}$ to the doses on upward and downward sides)×(the dose $\{Y\}$ on downward side), i.e. $a=X+\mu_3\times Y$.

(The measured value $\{b\}$ below partition)=(the attenuation ratio $\{\mu_3\}$ to the doses on upward and downward sides)×(the dose $\{X\}$ on upward side)+(the dose $\{Y\}$ on downward side), i.e. $a=X+\mu_3\times Y$.

(The measured value $\{c\}$ without using partition)=(the dose $\{X\}$ on upward side)+(the dose $\{Y\}$ on downward side), i.e. $c=X+Y$.

Thus, unknown numbers (X, Y) are determined as follows:

1. (The dose $\{X\}$ on upward side)=[(the measured value $\{c\}$ without using partition)$^2$−(the measured value $\{b\}$ below the partition)]×(the measured value $\{c\}$ without using partition)/[2×(the measured value $\{c\}$ without using partition)−(the measured value $\{a\}$ above the partition)−(the measured value $\{b\}$ below the partition)], i.e. $X=(c^2-b\times c)/(2\times c-a-b)$.

2. (The dose $\{Y\}$ on downward side)=[(the measured value $\{c\}$ without using partition)$^2$−(the measured value $\{a\}$ above partition)]×(the measured value $\{c\}$ without using partition)/[2×(the measured value $\{c\}$ without using partition)−(the measured value $\{a\}$ above the partition)−(the measured value $\{b\}$ below the partition)], i.e. $Y=(c^2-a\times c)/(2\times c-a-b)$.

To sum up, the present disclosure is a method of measuring radiation doses on different directions, where a partition having attenuation is used to measure radiation doses on different directions.

The preferred embodiments herein disclosed are not intended to unnecessarily limit the scope of the disclosure. Therefore, simple modifications or variations belonging to the equivalent of the scope of the claims and the instructions disclosed herein for a patent are all within the scope of the present disclosure.

What is claimed is:

1. A method of measuring radiation doses on different directions, the method comprising:
   (a1) processing measurement of a detection point with a single partition to obtain a measured value on a side of said single partition and a measured value on an opposite side of said single partition;
   (b1) processing measurement of said detection point with a dual-partition to obtain a measured value on a side of said dual-partition and a measured value on an opposite side of said dual-partition;
   (c1) processing measurement of said detection point to obtain a measured value without using partition; and
   (d1) determining a dose on said side of said single partition and dual-partition, a dose on said opposite side of said single partition and dual-partition, and a dose on surrounding sides based on said measured values obtained in steps (a1) to (c1).

2. The method according to claim 1, wherein (said dose on an upward side)=[(said measured value without using partition)−(said measured value on said opposite side of said single partition)]$^2$/[(said measured value without using partition)+(said measured value below said dual-partition)−2× (said measured value on said opposite side of said single partition)].

3. The method according to claim 1, wherein (said dose on a downward side)=[(said measured value without using partition)−(said measured value on said side of said single partition)]$^2$/[(said measured value without using partition)+(said measured value on said side of said dual-partition)−2×(said measured value on said side of said single partition)].

4. The method according to claim 1, wherein (said dose on a surrounding side)=(said measured value without using partition)−(said dose on an upward side)−(said dose on a downward side).

5. A method of measuring radiation doses on different directions, the method comprising:
   (a2) processing measurement of a detection point with a partition to obtain a measured value on a side of said partition and a measured value on an opposite side of said partition;
   (b2) processing measurement of said detection point to obtain a measured value without using partition; and
   (c2) determining a dose on an upward side and a dose on a downward side based on said measured values obtained in steps (a2) and (b2).

6. The method according to claim 5, wherein (said dose on said upward side)=[(said measured value without using partition)$^2$−(said measured value on said opposite side of said partition)×(said measured value without using partition)]/[2× (said measured value without using partition)−(said measured value on said side of said partition)−(said measured value on said opposite side of partition)].

7. The method according to claim 5, wherein (dose on said downward side)=[(said measured value without using partition)$^2$−(said measured value on said side of said partition)× (said measured value without using partition)]/[2×(said measured value without using partition)−(said measured value on said side of said partition)−(said measured value on said opposite side of partition)].

* * * * *